(12) United States Patent
Soulodre

(10) Patent No.: US 6,738,445 B1
(45) Date of Patent: May 18, 2004

(54) METHOD AND APPARATUS FOR CHANGING THE FREQUENCY CONTENT OF AN INPUT SIGNAL AND FOR CHANGING PERCEPTIBILITY OF A COMPONENT OF AN INPUT SIGNAL

(75) Inventor: Gilbert Arthur Joseph Soulodre, Kanata (CA)

(73) Assignees: IVL Technologies Ltd., Victoria (CA); Canada Inc., Kanta (CA)

( * ) Notice: Subject to any disclaimer, the term of this patent is extended or adjusted under 35 U.S.C. 154(b) by 0 days.

(21) Appl. No.: 09/449,827

(22) Filed: Nov. 26, 1999

(51) Int. Cl.[7] .............................................. H04L 23/00
(52) U.S. Cl. ..................... 375/377; 381/94.2
(58) Field of Search .............. 381/94.1, 94.2, 381/94.3, 61, 56, 59; 375/377, 316

(56) References Cited

U.S. PATENT DOCUMENTS

| | | | |
|---|---|---|---|
| 4,897,878 A | | 1/1990 | Boll et al. ...................... 381/43 |
| 5,133,013 A | | 7/1992 | Munday ....................... 381/47 |
| 5,249,205 A | * | 9/1993 | Chennakeshu et al. ...... 375/348 |
| 5,373,098 A | * | 12/1994 | Kitayama et al. ............. 84/659 |
| 5,400,151 A | | 3/1995 | Okada ......................... 358/340 |
| 5,498,998 A | * | 3/1996 | Gehrke et al. ................ 331/17 |
| 5,651,071 A | | 7/1997 | Lindemann et al. ........ 381/68.2 |
| 5,727,072 A | | 3/1998 | Raman ....................... 381/94.2 |

OTHER PUBLICATIONS

A.M. Kondoz, "Digital Speech: Coding for Low Bit Rate Communications Ssytems", West Sussex, England, John Wiley & Sons, 1994, pp. 130–132.

N.S. Jayant, Peter Noll, "Digital Coding of Waveforms: Principles and Applications to Speech and Video", Englewood Cliffs, New Jersey, Prentice–Hall, Inc., 1984, pp. 26–29, 39–41.

Douglas O'Shaughnessy, "Speech Communication: Human and Machine", Reading, Massachusetts, Addison–Wesley Publishing Company, 1987, pp. 39–41, 204–219.

Scott Nathan Levine, "Audio Representations for Data Compression and Compressed Domain Processing", diss., Stanford University, Department of Electrical Engineering, Dec. 1998.

* cited by examiner

*Primary Examiner*—Jean B. Corrielus

(57) ABSTRACT

There is disclosed a method and apparatus for changing the frequency content of an input spectrum and a method and apparatus for reducing the perceptibility of a component of an input signal. The first aspect involves adjusting frequency components of the input spectrum in response to a time varying adjustment frequency spectrum to produce an output frequency spectrum including adjusted frequency components of the input spectrum. The time varying input spectrum may be produced by selectively addressing a number of individual sub-spectra at different times. In addition, the input spectrum may be divided into a plurality of sub-spectra and each sub-spectrum may be operated on separately by a different adjustment frequency spectrum at different times. In addition, a perceptual model may be used to enhance the adjustment of the input spectrum or sub-spectra. The second aspect involves adjusting frequency components of a first analysis windowed frame of input time samples in response to an adjustment frequency spectrum, to produce an output frame of output time samples and synthesis windowing the output frame to produce a synthesis windowed frame of output time samples representing a time varying output signal having reduced perceptibility of the component. Different windows are used to produce different input spectra for use as the input spectrum on which the adjustment is made and for use in a perceptual model to provide maximum energy to the perceptual model to enable it to have its full effect in producing the adjustment frequency spectrum.

125 Claims, 4 Drawing Sheets

METHOD AND APPARATUS FOR CHANGING THE FREQUENCY CONTENT OF AN INPUT SIGNAL AND FOR CHANGING PERCEPTIBILITY OF A COMPONENT OF AN INPUT SIGNAL

FIELD OF THE INVENTION

This invention relates to alteration of frequency components of an input signal spectrum to reduce the perceptibility of a component of the input signal. One application includes changing noise in an audio signal.

BACKGROUND OF THE INVENTION

Microphones such as those used during commercial broadcasting, motion picture filming and communications, for example, are often susceptible to unwanted sounds made by background objects such as air conditioning systems, propellers, engines, fans, computer disk drives or shutter mechanisms on motion picture cameras, for example. This can result in the unwanted sounds being converted by the microphone into an undesirable portion of the electrical signal produced by the microphone. Undesirable signals can also be introduced through a variety of other sources such as quantization noise and electromagnetic Interference, for example.

Techniques exist for reducing the undesirable portion of a signal (i.e. noise), however, such techniques often result in distortion of the desirable portion of the signal or add audible artifacts to the signal, detracting from the effect of the technique. Consequently, such techniques only produce satisfactory results when the unwanted component of the signal is well below the desired portion of the signal, or in other words, when the signal to noise ratio is relatively high.

Current noise reduction techniques include a spectral subtraction method in which a noise spectrum is subtracted from the spectrum of the input signal. In this technique the processing is done entirely on the spectral magnitude of the input signal and the phase of the input signal is left unchanged. While this technique can offer a perceived reduction of the unwanted signal, it has been found that as the signal-to-noise ratio decreases, audible artifacts tend to become more and more noticeable in the output signal. Such artifacts include musical noise, incomplete or variable cancellation of the noise which can produce modulation of the noise floor, timbral effects and/or loss of frequency components of the signal, missing sounds, loss of low level signal (speech) components, phase distortions, time aliasing, and pre-echoes and post echoes which can result in temporal smearing. For input signals having a relatively high signal-to-noise ratio these artifacts may not be too disturbing and may go unnoticed by the listener. However, at lower signal-to-noise ratios these artifacts are often more perceptually disturbing than the original unwanted signal thus negating the value of the technique.

Each of these artifacts is a result of two underlying assumptions upon which spectral subtraction is based, namely that the spectral magnitude of the noise is equal to the expected value of the noise and that the phase of the signal can be approximated by the phase of the noisy signal.

In addition, spectral subtraction is done with a constant subtraction spectrum (or adjustment frequency spectrum) which typically consists of the average (expected) value of the unwanted signal as measured over a short interval of time. This can result in overprocessing of the signal which further leads to the artifacts listed above. This can be particularly limiting to noise reduction in signals in which the noise in the input signal changes over time, especially if the noise changes in a repetitive way, such as the noise produced by a shutter mechanism of a motion picture camera. In such a case, the periods of the input signal that have a lower noise level will be processed in the same manner as the periods where the noise level is high. As a result, the lower noise periods will be overprocessed and the artifacts will be more noticeable.

Thus there is a need to alter frequency components of an input signal spectrum to reduce the perceptibility of a component of the Input signal, while minimizing artifact production, particularly where the input signal has an undesirable repetitive component.

SUMMARY OF THE INVENTION

In accordance with one aspect of the invention, the present invention addresses the above need by providing a method and apparatus for changing the frequency content of an input spectrum, which involves adjusting frequency components of the input spectrum In response to a time varying adjustment frequency spectrum to produce an output frequency spectrum including adjusted frequency components of the input spectrum.

By using a time varying adjustment frequency spectrum to adjust the frequency content of the input spectrum, optimum adjustment frequency spectra can be used during corresponding periods of the input signal such that only the required amount of signal processing is done to adjust the frequency components of the input signal, for each segment of the input signal. This is particularly useful where the undesired component is a repetitive noise, such as sounds caused by a shutter mechanism of a motion picture camera, for example. The noise spectrum for the period during which the shutter is actuated is different than the noise spectrum for the period during which the shutter is inactive.

During periods when the shutter is actuated, the noise component may have a relatively high loudness level and may have a relatively strong high frequency content. When the shutter is inactive, the; noise spectrum may merely consist of noise from a motor in the motion picture camera, for example, and may therefore have a greatly reduced loudness level and may have a greater low frequency content By selectively using one or the other of these spectra for adjustment of the spectrum of the input signal during respective corresponding periods of the input signal, only frequency components of the input signal which correspond to those of the noise during that segment are affected, resulting in processing only frequency components in the input signal which coincide with noise frequency components in existence during that period. Thus, effectively a time varying adjustment spectrum is generated and used to adjust the input spectrum. The number of spectra used to produce such a time varying adjustment spectrum for any one signal will depend upon the number of segments, or frames, into which the input signal is divided. There is no limit on this number.

In addition, the method and apparatus involve dividing the frequency components of the input spectrum into a plurality of frequency bands and applying a separate time varying adjustment spectrum to each band. This allows the adjustment process to be matched to the time-frequency distribution of the noise, such that frequencies of the input signal in some bands may be adjusted more greatly than frequencies in other bands, while the time varying adjustment frequency spectrum provides the best adjustment spectrum for the instant period of the input signal. In other words, the processing is divided in time and frequency so as to match the processing to the particular characteristics of the noise. This allows the noise reduction processing to track the cyclical or repetitive characteristics of the noise. This inherently reduces all formns of audible artifacts since the average amount of processing applied to the input signal is minimized. At time intervals and frequencies where the noise is loudest, more aggressive processing is employed. Elsewhere, less aggressive processing is applied. In general, this allows processing to occur with the best signal to noise ratios in each frequency band, resulting in fewer artifacts being produced.

The method and apparatus may also include a perceptual model. The purpose of the perceptual model is to determine which portions of the unwanted signal are being masked by the desired signal and which are not being masked. Masking is the phenomenon that occurs in the human auditory system by which a signal which would otherwise be audible is rendered inaudible by the presence of another signal. By including a perceptual model in the processing, only the audible portion of the unwanted signal is removed, and thus the overall adjustment of frequencies applied to the input signal is further reduced. As a result, the artifacts that result from adjusting these frequencies are reduced. The perceptual model produces the adjustment frequency spectrum using an input spectrum derived from the input signal, and a reference signal, or reference spectrum. The reduction of artifacts may be achieved with or without the time varying adjustment frequency spectrum, or frequency banding described above.

In accordance with another aspect of the invention, the present invention further addresses the above need by providing a method and apparatus for reducing the perceptibility of a component of an input signal, Involving adjusting frequency components of a first analysis windowed frame of input time samples in response to an adjustment frequency spectrum, to produce an output frame of output time samples and synthesis windowing the output frame to produce a synthesis windowed frame of output time samples representing a time varying output signal having reduced perceptibility of the component.

In one embodiment, there is an overlapping synthesis window having boundaries and a zero-tending taper at the boundaries, which reduces artifacts at the edges of sample frames of time samples taken of the input signal. Preferably, the input samples are windowed by an overlapping analysis window and then a first time-to-frequency domain conversion is performed on the first analysis windowed frame of input samples to produce an input spectrum which can be adjusted by an adjustment processor. In this embodiment, the time-to-frequency domain conversion is done using a Discrete Fourier Transform (DFT) although it will be appreciated that other methods are possible, including other transforms or filter banks, for example.

The overlapping analysis window has the effect of dividing the input signal into overlapping frames for processing. The output signal is then windowed by the overlapping synthesis window prior to an overlap-and-add process. Preferably, the overlapping analysis and overlapping synthesis windows are chosen such that the combination of the overlapping analysis windows and the overlapping synthesis windows has no net effect on the signal. That is, the analysis and synthesis windows, as well as the amount of overlapping are chosen such that, in the absence of any intermediate processing, the output signal is identical to the input signal. To accomplish this the result of multiplying the analysis and synthesis windows and summing across overlapping frames equals unity. However, this may result in errors in the adjustment frequency spectrum generated when the method and apparatus include a perceptual model. If the first analysis windowed frame of samples is used as the input to the perceptual model, then the perceptual model may not have an accurate representation of the input spectrum since the spectrum reaching the perceptual model does not include the effects of the synthesis window. That is, the perceptual model would predict the adjustment frequency spectrum using data that has only been windowed by the analysis window. Therefore, a second overlapping analysis window is employed to produce a second analysis windowed frame of input samples for use by a perceptual model which operates on both the second analysis windowed frame of input samples and a reference frequency spectrum to produce the adjustment frequency spectrum. Thus, an accurate input spectrum can be applied to the perceptual model to permit full consideration of the input spectrum by the perceptual model which results in the full effect of masking to be taken into account by the perceptual model, thereby reducing the amount of processing required on some frequency components and reducing the potential for artifact creation.

The use of the overlapping analysis and overlapping synthesis windows with the perceptual model may be further combined with the above described time varying reference frequency spectrum, in which case the perceptual model produces a time varying adjustment frequency spectrum for use by the adjustment processor to achieve the benefits of sub-framing described above. Furthermore, the input spectrum may be banded as described above to obtain the benefits of matching the time frequency distribution of the unwanted component to the spectral adjustment process.

BRIEF DESCRIPTION OF THE DRAWINGS

In drawings which illustrate embodiments of the invention.

DETAILED DESCRIPTION

Figure 1:
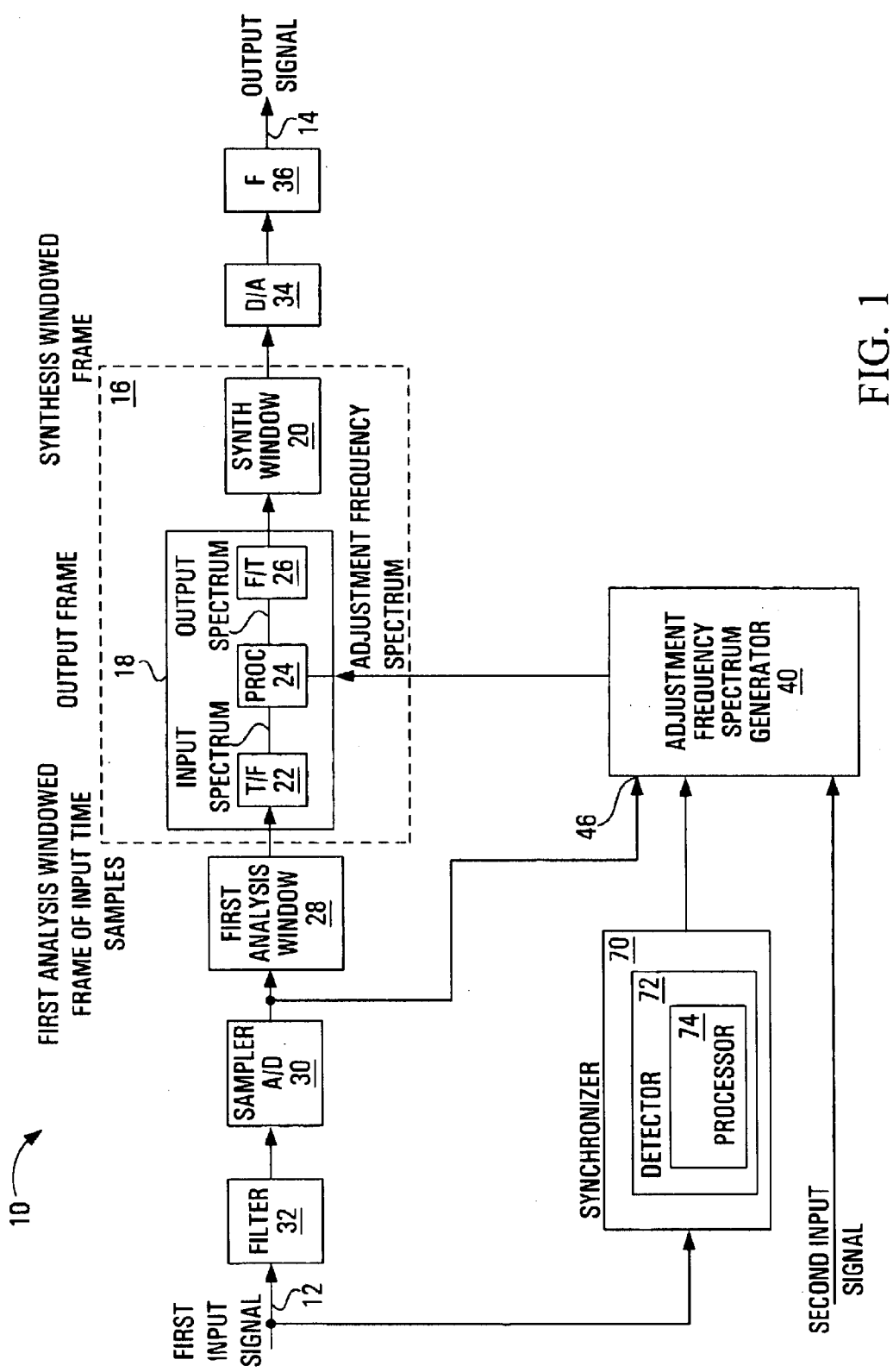
FIG. 1 is a block diagram of an apparatus for reducing the perceptibility of a component of an input signal, according to a first embodiment of the invention.

As shown in FIG. 1, an apparatus for reducing the perceptibility of a component of an input signal, according to a first embodiment of the invention is shown generally at 10. In this embodiment, the apparatus has a first input 12, for receiving a first analog input signal which may be a conventional line-level audio signal, for example, representing a recording or live performance of voice or music in the presence of an undesired component such as noise which may have been created by a fan, air conditioner, motion picture camera, etc., for example.

The apparatus also has an output 14 at which a line-level analog output signal is produced, the output signal generally retaining the original voice or music performance, but with the undesirable component such as background noise from the fan, air conditioner or motion picture camera, etc., significantly reduced and preferably reduced to the point of imperceptibility by a listener.

Alternatively, a video signal may act as the input signal and the apparatus, if suitably configured, can reduce perceptible visual noise.

To achieve the above end, in the audio noise reduction example, the apparatus includes a perceptibility reduction apparatus 16 for reducing perceptibility of an undesired component of an input signal. The perceptibility reduction apparatus has a processing circuit 18 for adjusting frequency components of a first analysis windowed frame of input time samples in response to an adjustment frequency spectrum, to produce an output frame of output time samples. An overlapping synthesis window 20 is used to synthesis window the output frame to produce a synthesis windowed frame of output time samples representing a time varying output signal having reduced perceptibility of the undesired component.

In this embodiment, the processing circuit 18 includes three processors including a first time-to-frequency domain processor 22, an adjustment processor 24 and a first frequency-to-time domain processor 26. It will be appreciated that any combination of these processors may be combined into a single processor or multiple processors.

Generally, the first time-to-frequency domain processor 22 is operable to produce an input spectrum in response to input time samples. To achieve time-to-frequency domain conversion, the time-to-frequency domain processor 22 may execute a Discrete Fourier Transform (DFT), Discrete Cosine transform, discrete Hartley transform or wavelet transform or other transform or may be replaced by or may implement an analysis filter bank. In this embodiment, a DFT is used.

The adjustment processor 24 is operable to adjust frequency components of the input spectrum in response to an adjustment frequency spectrum to produce an output frequency spectrum including adjusted frequency components of the input spectrum.

The first frequency-to-time domain processor 26 is operable to produce an output frame of time samples in response to the output frequency spectrum. The first frequency-to-time domain processor 26 generally performs the inverse function of the first time-to-frequency domain processor 22. Consequently, in this embodiment, the frequency-to-time domain processor performs an Inverse Discrete Fourier Transform (IDFT).

In one embodiment, which is particularly useful for reducing undesired components having repetitive elements, the adjustment processor 24 adjusts frequency components of the input spectrum in response to a time varying adjustment frequency spectrum. In particular, the adjustment frequency spectrum is varied in time to apply different adjustment frequency spectra to the adjustment processor 24 at different times, to cause the best adjustment frequency spectra to be used by the adjustment processor 24 within a given time period. This is particularly useful for reducing noise of motion picture cameras, including IMAX (tm) motion picture cameras, for example, which have a repetitive noise component due to a mechanical shutter mechanism in the motion picture camera.

Thus, one aspect of the invention involves adjusting frequency components of a first analysis windowed frame of input time samples in response to an adjustment frequency spectrum to produce an output frame which is windowed by a synthesis window to produce a windowed frame of output time samples, and another aspect of the invention involves adjusting frequency components of an input spectrum in response to a time varying adjustment frequency spectrum to produce an output frequency spectrum.

To achieve the first aspect of the invention, the apparatus further Includes a first overlapping analysis window 28. The first overlapping analysis window may be implemented by the first time-to-frequency domain processor 22, or any other processor, for example Preferably, the overlapping analysis and overlapping synthesis windows function such that the combination of overlapping analysis windows and overlapping synthesis windows has no net effect on the signal. That is, the analysis and synthesis windows, as well as the amount of overlapping are chosen such that, in the absence of any intermediate processing, the output signal is identical to the input signal. To accomplish this, the result of multiplying the analysis and synthesis windows and summing across overlapping frames equals unity.

A rectangular shaped synthesis window is undesirable, even if it sums to unity with the first analysis window, because it tends to produce audible artifacts at the boundaries of each input frame.

The input to the first overlapping analysis window 28 is a frame of time samples produced by a sampler 30 which receives a filtered version of the input signal from a lowpass filter 32 acting on the first input signal.

At the output aide of the apparatus, the synthesis windowed frame of output time samples produced by the overlapping synthesis window 20 is provided to a digital to analog converter 34 to produce an unfiltered analog signal. The unfiltered analog signal is provided to a lowpass filter 36 and the filter provides an output signal with reduced perceptibility of the undesired component at the output 14.

The property can be expressed mathematically as follows.

$$\sum^{i} (Wai * Wsi) = 1$$

where Wai is the analysis window, Wsi is the synthesis window and i represents the frame index.

This is further described in R. E. Crochiere and L. R. Rabiner "Multirate Digital Signal Processing" Englewood Cliffs, Prentice-Hall, 1983, pp. 335–338, incorporated herein by reference.

Adjustment Frequency Spectrum Generator

In this embodiment, the adjustment frequency spectrum used by the adjustment processor 24 is provided by an adjustment frequency spectrum generator 40.

Figure 2:
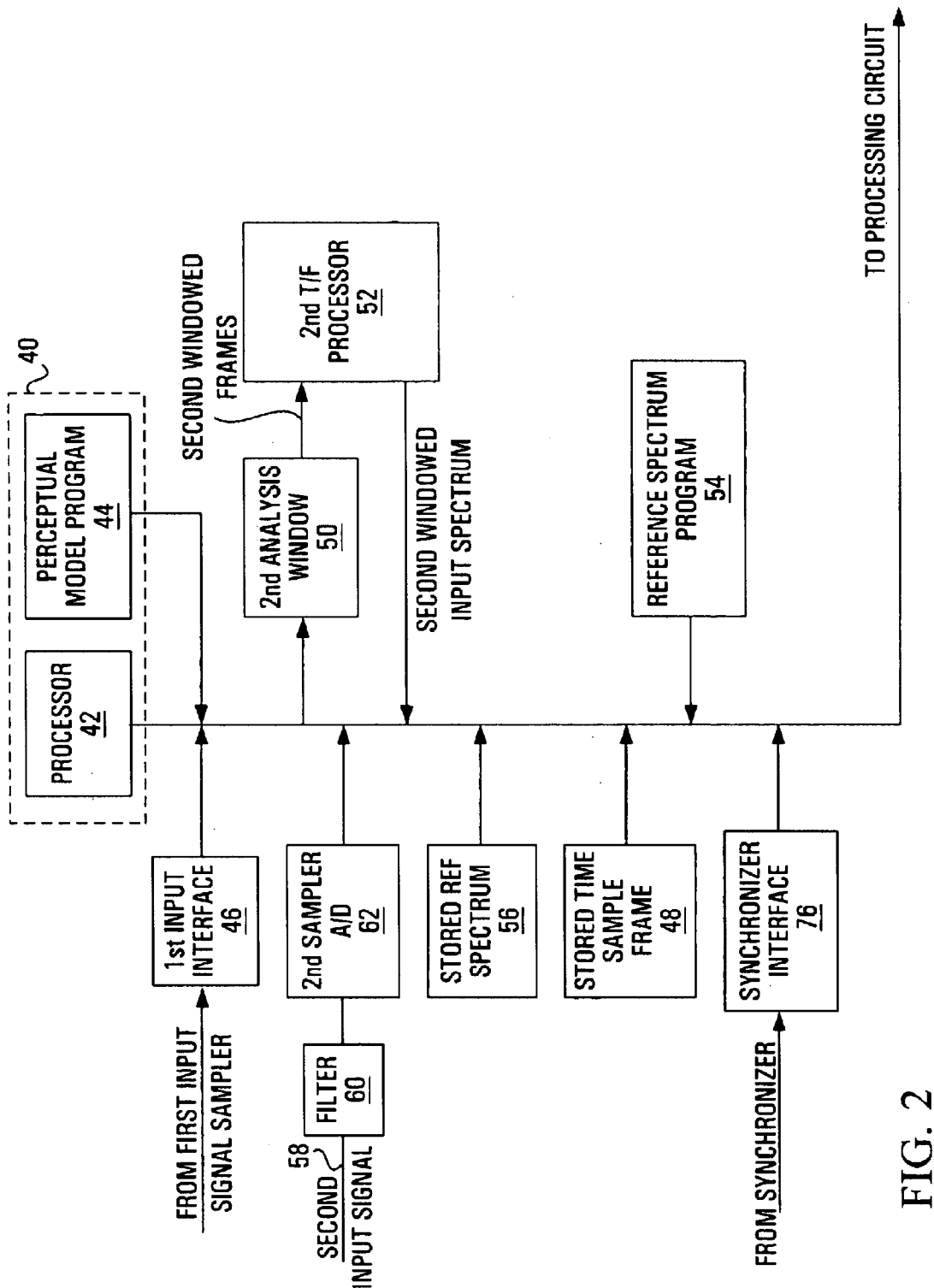
FIG. 2 is a block diagram of an adjustment spectrum generator shown in FIG. 1.

Referring to FIG. 2, in this embodiment, the adjustment frequency spectrum generator 40 includes a processor 42 and memory 44 for storing a perceptual model program operable to direct the processor 42 to implement a perceptual model. Perceptual models suitable for this application include those of the type proposed by Tsoukalas et al. in an article entitled "Perceptual Filters for Audio Signal Enhancement" published in the Journal of the Audio Engineering Society, Vol. 45, no.1/2 pp22–36 January/February 1997, incorporated herein by reference. Preferably, the perceptual model takes into account the effects of simultaneous and non-simultaneous masking, the outer ear, attenuation effects of the auditory canal and the middle ear and the internal noise of the inner ear. Generally, the processor 42, under the direction of the perceptual model program, cooperates to produce an adjustment frequency spectrum in response to an input signal spectrum and a reference spectrum.

The input signal spectrum used by the adjustment frequency spectrum generator 40 is obtained by receiving input frames of input signal time samples from the sampler 30 shown in FIG. 1, at a first input interface 46 shown in FIG. 2. The first input interface serves to permit the processor 42 to receive the input frames and store them in a storage area 48. A second overlapping analysis window 50 runs on the processor 42 and applies a second windowing function to the input frames of samples to produce second windowed frames of input time samples. These second windowed frames are provided to a second time-to-frequency domain processor 52, to produce a second windowed input spectrum for use by the processor 42 when running the perceptual model program. In this embodiment, the processor 52 is separate from the processor 42, however, alternatively a single processor may function as both processors 42 and 52.

The second overlapping analysis window 50 is preferably designed such that the combination of windowing and overlapping sums to unity. A suitable second overlapping analysis window is a Hanning window with 50% overlap, however, other windowing functions and overlapping may be substituted.

Reference Spectrum

The reference spectrum to be used in the perceptual model program is produced by the processor 42 under the direction of a reference spectrum program stored in a memory 54 and executable by the processor 42. In this embodiment, the reference spectrum program is capable of producing a reference spectrum in a variety of user-selectable ways.

One such way involves retrieving a stored reference spectrum from a memory 56. Such a stored reference spectrum may be initially obtained by derivation, or acquisition from a reference signal. Such a reference signal may be a second input signal received at a second input terminal 58 and lowpass filtered by a lowpass filter 60 to produce a filtered second input signal. The filtered second input signal is then provided to a second sampler 62 which produces second input frames of time samples of the second input signal. These second input frames are then processed through the second overlapping analysis window 50 and second time-to-frequency domain processor 52 to produce a second input frequency spectrum, which may be stored in the memory 56 as a reference frequency spectrum, for later use.

Alternatively, the reference frequency spectrum may be acquired from the input signal by processing input frames received at the first input interface 46 through the second overlapping analysis window 50 and the second time-to-frequency domain processor 52 to produce an input frequency spectrum as described above, and storing the so acquired input frequency spectrum In the memory 56 for later use as a reference frequency spectrum.

Acquiring the reference frequency spectrum from the input signal is desirable where the input audio signal has periods during which there is no voice or music content such that the input signal consists only of noise, during a short period. During this short period, the input signal can be sampled to produce the input frames from which the reference frequency spectrum can be derived using the second overlapping analysis window and the second time-to-frequency domain processor as described above. In this manner essentially, the frequency spectrum of the background noise in the input signal can be used as the reference frequency spectrum.

Alternatively, sample frames of the first or second input signals may be stored for later use and when use is required, the second overlapping analysis window 50 and the second time-to-frequency domain processor 52 may be used to derive reference frequency spectra from these sample frames for instant use.

In any event a reference frequency spectrum is either pre-stored or acquired using one of the methods described above, or equivalents thereof, and is stored in the memory 56 for use by the processor 42 in the perceptual model, or by itself, as described further below.

Subframing

Figure 3:
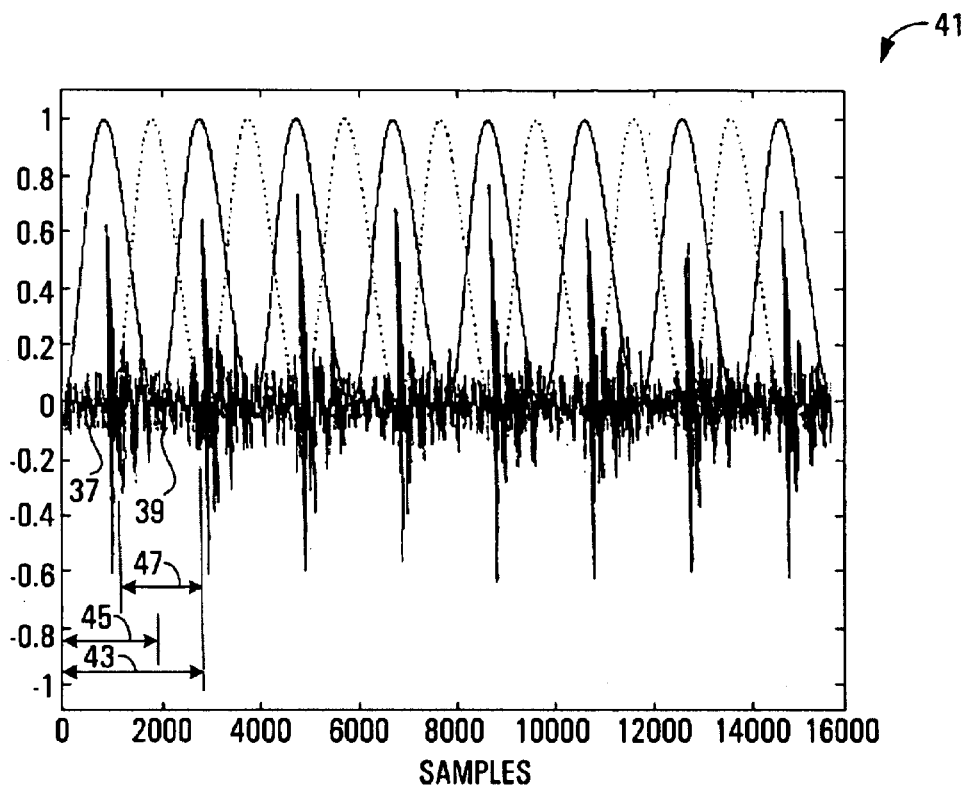
FIG. 3 is a representation of framing and sub-framing applied to a noise signal produced by a motion picture camera.
Figure 4:
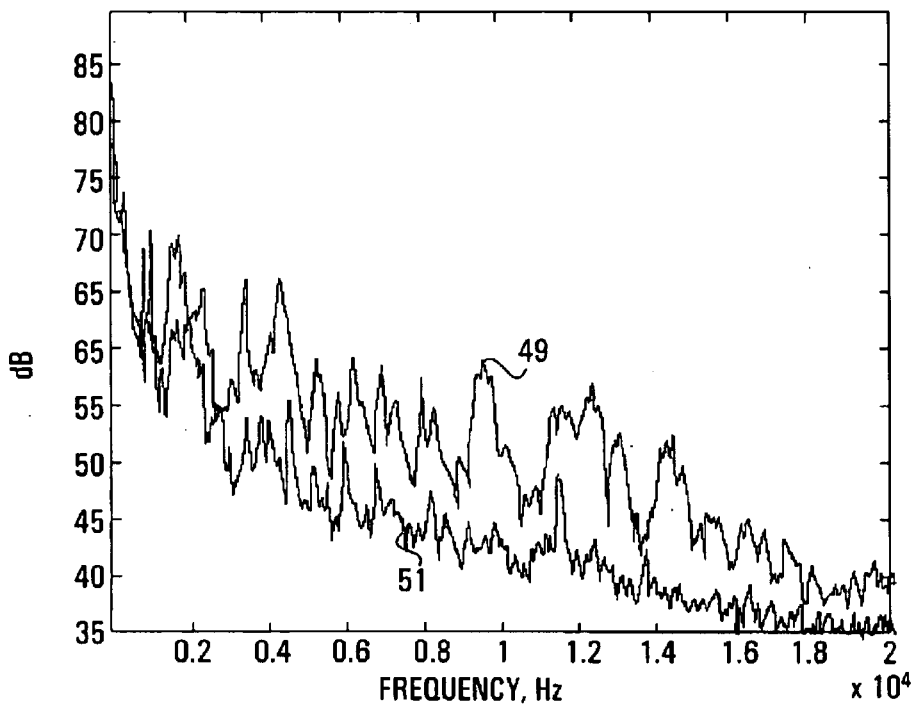
FIG. 4 is a representation of reference frequency spectra derived from sub-frames shown in FIG. 3.

Referring to FIG. 3, an example of a time varying noise signal produced by a motion picture camera is shown generally at 41. A frame of samples shown at 43 is stored in the storage area 48 shown in FIG. 2 and may be acquired from the first input interface 46 or the second sampler 62, for example. In the case of attempting to reduce perceptibility of undesired components which have a repetitive nature, such as motion picture camera noise, it will be appreciated that the time varying noise signal has noise peak (maximum) and noise null (minimum) segments 37 and 39 respectively. The reference spectrum program therefore preferably directs the processor 42 to divide the pre-stored sample frame 43 into sub-frames such as those shown at 45 and 47 corresponding to the noise peak and noise null segments 37 and 39 respectively and to produce reference frequency spectra 49 and 51 shown in FIG. 4 corresponding to the sub-frames 45 and 47 respectively. Noise peak segments 37 will have a different reference frequency spectrum 49 than noise null segments 39 and therefore the reference spectra produced for each segment of the frame are different.

It will be appreciated that the number of samples of each segment need not be the same and zero padding may be used to increase the number of effective samples to a number consistent with the number of samples in an input frame, for consistency in time-to-frequency and frequency-to-time processing. Thus, each sub-frame is mapped into its own respective frame, which is then processed by the second overlapping analysis window 50 and the second time-to-frequency domain processor 52 to produce the corresponding reference frequency spectra 49 and 51 for each sub-frame. These corresponding reference frequency spectra 49 and 51 are then stored in the memory 56, for later use.

Use of these corresponding reference frequency spectra is made by accessing one of them at any given time for use as input to the perceptual model program along with an instant frame of input signal samples, for producing an instant adjustment frequency spectrum.

Due to the differing reference frequency spectra 49 and 51 of each of sub-frames 45 and 47, a time varying adjustment frequency spectrum can be produced by selectively retrieving and processing in the perceptual model different reference frequency spectra 49 and 51 at respective times, according to the particular segment 37 or 39 of the reference signal that is occurring. To do this, the apparatus includes a synchronizer as shown generally at 70 in FIG. 1.

In this embodiment, the synchronizer 70 includes a detector 72 for detecting a periodic signal component in the input signal. The detector may include a processor 74 for approximating the second time derivative of portions of the Input signal having an amplitude greater than a threshold amplitude, to produce a digital pulse signal having a rising edge at the beginning of each repetition or cycle of the repetitive component in the input signal. Thus, the detector accounts for the level and period of the repetitive component.

Referring back to FIG. 2, the adjustment frequency spectrum generator 40 includes a synchronizer interface 76 which receives the pulse signal from the synchronizer 70 and provides a corresponding signal to the processor 42. In response, the processor 42 addresses the reference frequency spectrum corresponding to the first segment for use by the perceptual model program while the first segment is occurring, and then successively addresses further reference frequency spectra corresponding to respective further segments as such further segments occur. In this manner, a time varying adjustment frequency spectrum is produced.

Alternatively, the perceptual model may be omitted and the processor 42 may simply provide the reference frequency spectra directly to the adjustment processor 24 at different times, also producing a time varying adjustment frequency spectrum. Thus, the adjustment frequency spectrum may be produced by directly accessing and providing to the adjustment processor 24, the reference frequency spectrum or by processing the reference frequency spectrum and the input spectrum produced by the second analysis windowed samples of the input signal through the perceptual model. Use of the perceptual model provides the best results, however, it adds cost to the system.

The operation of the apparatus can be further enhanced by dividing the input spectrum into input sub-spectra. For example, an input spectrum may have a bandwidth of 0–24 kHz. This may be divided into any number of bands, for example, four bands having frequency ranges between 0–3 kHz, 3 kHz–6 kHz, 6 kHz–12 kHz, 12 kHz–24 kHz. When a given segment of the repetitive component is occurring, the corresponding reference frequency spectrum is retrieved for use by the perceptual model, or for direct application to the adjustment processor 24 and the resulting adjustment frequency spectrum is divided into adjustment bands in the same frequency ranges as the input spectrum. The adjustment bands are used by the adjustment processor 24 to adjust frequencies in corresponding bands of the input spectrum. In this manner, sub-banding of the input spectrum along with sub-framing allows the spectral adjustment process to be matched to the time-frequency distribution of the respective noise. Consequently, noisier parts of the input signal receive more aggressive processing, while less noisy parts of the input signal receive less processing, thereby minimizing artifacts.

Figure 5:
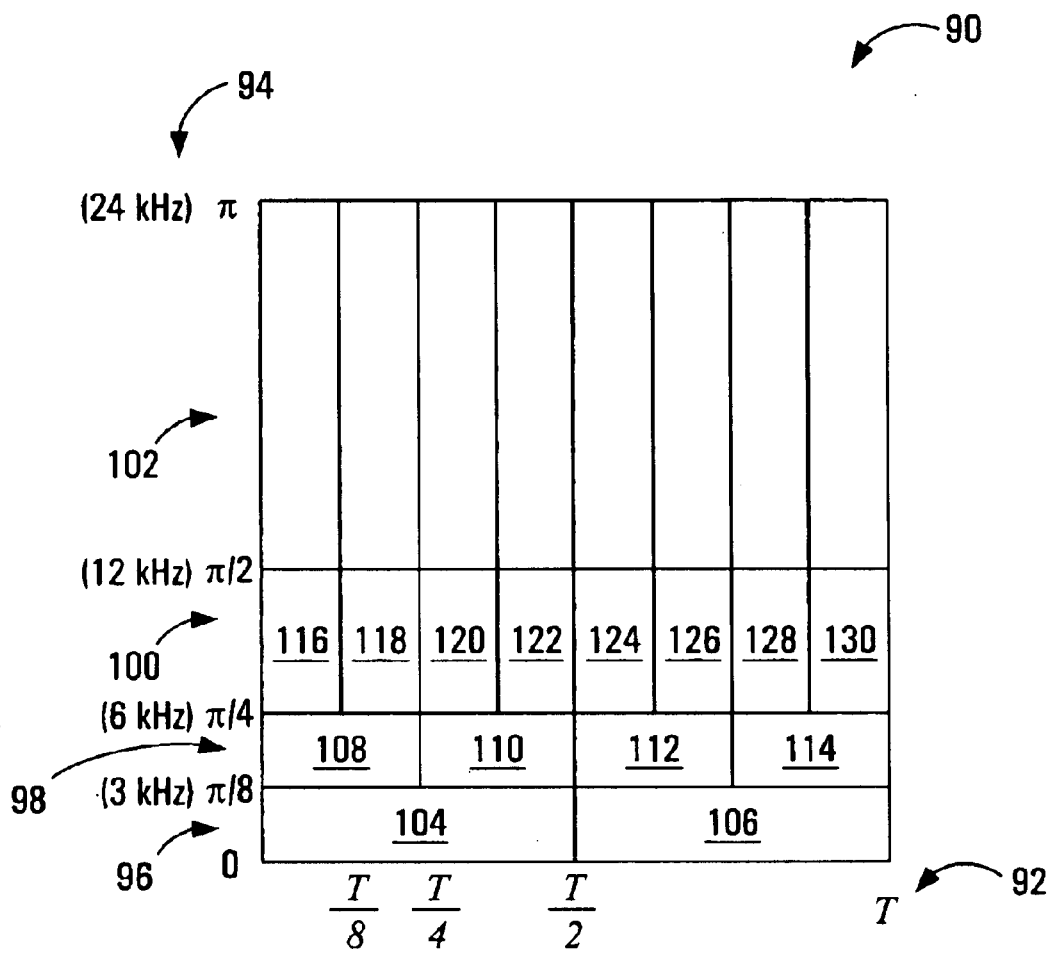
FIG. 5 is a representation of time frequency cells Illustrating sub-framing and sub-banding, according to one embodiment of the invention.

For example, a time-frequency plane for a signal sampled at 48 kHz and sub-framed into 8 sub-frames is shown generally at 90 in FIG. 5. The plane has a horizontal axis 92 which represents time with T indicating the period of the repetitive noise signal, and has a vertical axis 94 which represents frequency with π indicating the normalized Nyquist frequency (i.e. one half the sampling frequency). The various vertical and horizontal lines indicate how the input signal is divided into sub-spectra and sub-frames. Specifically, the vertical lines indicate the boundaries of the sub-frames, while the horizontal lines indicate the boundaries of the sub-spectra.

It can be seen from FIG. 5 that, for this example, the input signal (and thus the noise reduction processing) is divided into 4 non-uniformly spaced sub-spectra 96, 98, 100 and 102 respectively. A first sub-spectrum 96 has frequency components in the range of frequencies from 0 to π/8, (0–3 kHz) while the second sub-spectrum 98 has frequency components in the range of frequencies from π/8 to π/4, (3 kHz–6 kHz). The remaining two sub-spectra 100 and 102 have frequencies in the ranges from π/4 to π/2 (6 kHz–12 kHz) and π/2 to π (12 kHz–24 kHz) respectively.

It can further be seen from the figure that each sub-spectrum has a different number of sub-frames. Specifically, the lowest frequency sub-spectrum 96 is divided into two sub-frames 104 and 106. The next sub-spectrum 98 is divided into 4 sub-frames 108, 110, 112 and 114 and the remaining sub-spectra are each divided into 8 sub-frames 116, 118, 120, 122, 124, 126, 128 and 130.

Thus, each band is associated with a plurality of sub-frames. During each sub-frame, a different reference frequency spectrum can be applied to the perceptual model or applied directly to the adjustment processor 24, to provide an optimum adjustment frequency spectrum for use in adjusting the associated sub-spectrum of the input signal. An optimum adjustment frequency spectrum is one which best represents the undesired component (noise) in the frequency band associated with the sub-spectrum.

This particular decomposition of the time-frequency plane is merely shown as an Illustrative example. There are an infinite number of possible ways to decompose the input signal (and thus the processing) into sub-spectra and sub-frames. It should also be noted that, while FIG. 5 shows each sub-spectrum being divided uniformly into sub-frames of equal size, this is not a necessary condition. That is, the sub-frames within a given sub-spectrum can have different lengths.

While specific embodiments of the invention have been described and illustrated, such embodiments should be considered illustrative of the invention only and not as limiting the invention as construed in accordance with the accompanying claims.

What is claimed is:

1. A method of changing the frequency content of an input spectrum, the method comprising:
   producing a time varying adjustment frequency spectrum by selecting different adjustment frequency spectra at different times by retrieving at least one pre-stored adjustment frequency spectrum;
   adjusting frequency components of said input spectrum in response to said time varying adjustment frequency spectrum; and
   producing an output frequency spectrum including adjusted frequency components of said input spectrum.

2. A The method claimed in claim 1 further comprising deriving said adjustment frequency spectra from a reference signal.

3. The method claimed in claim 1 further comprising deriving said adjustment frequency spectra from an input signal.

4. The method claimed in claim 2 further comprising producing a time sample frame of said reference signal.

5. The method claimed in claim 4 wherein producing a time sample frame includes retrieving a pre-stored sample frame.

6. The method claimed in claim 4 wherein producing a time sample frame comprises time sampling a portion of an input signal.

7. The method claimed in claim 4, further comprising dividing said time sample frame into sub-frames and producing a corresponding adjustment frequency spectrum for each sub-frame.

8. The method claimed in claim 7, wherein dividing includes dividing said time sample frame into a plurality of sub-frames of different numbers of samples.

9. The method claimed in claim 7, further comprising producing said time varying adjustment frequency spectrum by successively selecting said corresponding adjustment spectra at respective times.

10. The method claimed in claim 9, wherein adjusting comprises synchronizing the selection of at least one adjustment frequency spectrum to a time component of an input signal.

11. The method claimed in claim 10 wherein synchronizing comprises detecting a periodic signal component in said input signal.

12. The method claimed in claim 11, wherein detecting includes approximating the second time derivative of said input signal.

13. The method claimed in claim 1, further comprising dividing said input spectrum into input sub-spectra having frequency components within respective frequency bands.

14. The method claimed in claim 13, wherein adjusting comprises adjusting frequency components of said input sub-spectra in response to respective time varying adjustment frequency spectra to produce respective sub-output spectra having respective sub-output frequency spectra including respective adjusted frequency components of respective input sub-spectra.

15. The method claimed in claim 14 further comprising combining said output sub-spectra to produce said output frequency spectrum.

16. The method claimed in claim 14 further comprising producing said time varying adjustment frequency spectra by, for each input sub-spectrum, selecting different adjustment frequency spectra at different times.

17. The method claimed in claim 16 wherein selecting different adjustment frequency spectra includes retrieving at least one pre-stored adjustment frequency spectrum.

18. The method claimed in claim 16 further comprising acquiring said adjustment frequency spectra from a reference signal.

19. The method claimed in claim 18 wherein acquiring comprises acquiring said adjustment frequency spectra from an input signal.

20. The method claimed in claim 18 further comprising producing a time sample frame of said reference signal.

21. The method claimed in claim 20 wherein producing a time sample frame includes retrieving a pre-stored sample frame.

22. The method claimed in claim 20 wherein producing a time sample frame comprises time sampling a portion of an input signal.

23. The method claimed in claim 20 wherein acquiring further comprises dividing said time sample frame into sub-frames and producing a corresponding adjustment frequency spectrum for each sub-frame.

24. The method claimed in claim 23 wherein dividing includes dividing said sample frame into a plurality of sub-frames of different numbers of samples.

25. The method claimed in claim 23 further comprising producing said time varying adjustment frequency spectrum by successively selecting said corresponding adjustment frequency spectra at respective times.

26. The method claimed in claim 1 further comprising analysis windowing input time samples representing an input signal to produce first analysis windowed time samples and performing a time-to-frequency conversion on said first analysis windowed time samples to produce said input spectrum and performing a frequency-to-time conversion on said output frequency spectrum to produce an output frame of output time samples.

27. The method claimed in claim 26 further comprising synthesis windowing said output frame to produce a synthesis windowed frame of output time samples.

28. The method claimed in claim 27 wherein synthesis windowing comprises synthesis windowing with overlapping synthesis windows having a zero-tending taper at boundaries thereof.

29. The method claimed in claim 28 wherein analysis windowing comprises analysis windowing with overlapping analysis windows and wherein analysis windowing and synthesis windowing are performed with overlapping analysis and synthesis windows wherein the result of multiplying the analysis and synthesis windows and summing across overlapping frames equals unity.

30. The method claimed in claim 29 further comprising producing a perceptual component estimate frequency spectrum for use as said adjustment frequency spectrum.

31. The method claimed in claim 30 wherein producing a perceptual component estimate frequency spectrum comprises applying a perceptual model to a reference spectrum and a second windowed spectrum derived from a second analysis windowed frame of input time samples to produce said perceptual component estimate frequency spectrum.

32. The method claimed in claim 31 wherein producing further comprises producing said second analysis windowed frame of input time samples.

33. The method claimed in claim 32 wherein producing further comprises performing a time-to-frequency conversion on said second analysis windowed frame of input time samples to produce a second windowed spectrum and applying said second windowed spectrum to said perceptual model.

34. The method claimed in claim 31 wherein producing further comprises producing said reference spectrum.

35. The method claimed in claim 26 wherein adjusting comprises reducing or increasing at least some frequency components of said input spectrum in response to said adjustment frequency spectrum.

36. An apparatus for changing the frequency content of an input spectrum, the apparatus comprising:
   an input interface for receiving a representation of the input spectrum;
   a memory for storing adjustment frequency spectra;
   an adjustment processor in communication with said input interface and said memory and programmed to receive different adjustment frequency spectra at different times by retrieving at least one pre-stored adjustment frequency spectrum from said memory, and said processor being programmed to adjust frequency components of said input spectrum in response to said at least one time varying adjustment frequency spectrum to produce an output frequency spectrum including adjusted frequency components of said input spectrum.

37. The apparatus claimed in claim 36 further comprising an adjustment frequency spectrum generator.

38. The apparatus claimed in claim 37 wherein said adjustment frequency spectrum generator comprises said adjustment processor programmed to produce an adjustment frequency spectrum from a reference signal.

39. The apparatus claimed in claim 37 wherein said adjustment processor is configured to produce said adjustment frequency spectrum from an input signal.

40. The apparatus claimed in claim 38 further comprising a time sample frame generator for generating a time sample frame from which said reference frequency spectrum is to be derived.

41. The apparatus claimed in claim 40 wherein said time sample frame generator comprises a sampler for producing a time sample frame of said reference signal.

42. The apparatus claimed in claim 40 wherein said time sample frame generator includes said adjustment processor and wherein said adjustment processor is programmed to retrieve a prestored sample frame.

43. The apparatus claimed in claim 40 wherein said time sample frame generator comprises a sampler for producing a time sample frame by time sampling a portion of an input signal.

44. The apparatus claimed in claim 41 wherein said time sample generator includes a divider for dividing said time sample frame into sub-frames.

45. The apparatus claimed in claim 44 wherein said sub-frames have different numbers of samples.

46. The apparatus claimed in claim 44 wherein said adjustment processor is programmed to produce a corresponding adjustment frequency spectrum for each sub-frame.

47. The apparatus claimed in claim 46 wherein said adjustment processor is programmed to produce said time varying adjustment frequency spectrum by successively selecting said corresponding adjustment spectra at respective times.

48. The apparatus claimed in claim 47 further comprising a synchronizer for synchronizing the selection of at least one adjustment frequency spectrum to a time component of an input signal.

49. The apparatus claimed in claim 48 wherein said synchronizer comprises a detector for detecting a periodic signal component in said input signal.

50. The apparatus claimed in claim 49 wherein said detector includes an approximator for approximating the second time derivative of said input signal.

51. The apparatus claimed in claim 40 wherein said adjustment processor is programmed to divide said input spectrum into input sub-spectra having frequency components within respective frequency bands.

52. The apparatus claimed in claim 51 wherein said adjustment processor is programmed to adjust frequency components of said input sub-spectra in response to said respective time varying adjustment frequency spectra to produce respective sub-output spectra including respective adjusted frequency components of respective input sub-spectra.

53. The apparatus claimed in claim 52 further comprising a combiner for combining said output sub-spectra to produce said output spectrum.

54. The apparatus claimed in claim 52 wherein said adjustment processor is programmed to produce said time varying adjustment frequency spectra by selecting different adjustment frequency spectra at different times, for each input sub-spectrum.

55. The apparatus claimed in claim 54 further comprising an adjustment frequency spectrum generator.

56. The apparatus claimed in claim 55, wherein said adjustment frequency spectrum generator comprises said adjustment processor programmed to produce an adjustment frequency spectrum from a reference signal.

57. The apparatus claimed in claim 55 wherein said adjustment processor is configured to produce said adjustment frequency spectrum from said input signal.

58. The apparatus claimed in claim 56 further comprising a time sample frame generator for generating a time sample frame from which said reference frequency spectrum is to be derived.

59. The apparatus claimed in claim 58 wherein said time sample frame generator comprises a sampler for producing a time sample frame of said reference signal.

60. The apparatus claimed in claim 58 wherein said time sample frame generator includes said adjustment processor and wherein said adjustment processor is programmed to retrieve a pre-stored sample frame.

61. The apparatus claimed in claim 58 wherein said time sample frame generator comprises a sampler for producing a time sample frame by time sampling a portion of an input signal.

62. The apparatus claimed in claim 59 wherein said time sample frame generator includes a divider for dividing said time sample frame into sub-frames.

63. The apparatus claimed in claim 62 wherein said sub-frames have different numbers of samples.

64. The apparatus claimed in claim 62 wherein said adjustment processor is programmed to produce a corresponding adjustment frequency spectrum for each sub-frame.

65. The apparatus claimed in claim 64 wherein said adjustment processor is programmed to produce said time varying adjustment frequency spectrum by successively selecting said corresponding adjustment spectra at respective times.

66. The apparatus claimed in claim 40 further comprising an analysis window for analysis windowing input time samples representing an input signal to produce first analysis windowed time samples and a first time-to-frequency processor for performing a time-to-frequency conversion on said first analysis windowed time samples to produce said input spectrum and a frequency-to-time processor for performing a frequency-to-time conversion on said output frequency spectrum to produce an output frame of output time samples.

67. The apparatus claimed in claim 66 further comprising an overlapping synthesis window for synthesis windowing said output frame to produce a synthesis windowed frame of output time samples.

68. The apparatus claimed in claims 67 wherein said overlapping synthesis window has boundaries and a zero-tending taper at said boundaries.

69. The apparatus claimed in claim 68 wherein said analysis window includes an overlapping analysis window and wherein the result of multiplying the analysis and synthesis windows and summing across overlapping frames equals unity.

70. The apparatus claimed in claim 66 further comprising an adjustment frequency spectrum generator.

71. The apparatus claimed in claim 70 wherein said adjustment frequency spectrum generator is operable to produce a perceptual component estimate frequency spectrum.

72. The apparatus claimed in claim 70 wherein said adjustment frequency spectrum generator comprises a processor programmed to execute a perceptual model on a reference spectrum and an input spectrum.

73. The apparatus claimed in claim 72 further comprising a second analysis window for producing a second analysis windowed frame of in put time samples.

74. The apparatus claimed in claim 73 further comprising a second time-to-frequency processor for performing a time-to-frequency conversion on said second analysis windowed frame of input time samples to produce a second windowed spectrum for use as said input spectrum in said perceptual model.

75. The apparatus claimed in claim 72 further comprising a processor for producing said reference spectrum.

76. The apparatus claimed in claim 66 wherein said adjustment processor is programmed to reduce or increase at least some frequency components of said input spectrum in response to said adjustment frequency spectrum.

77. A method of changing the perceptibility of a component of an input signal, comprising:
   a) adjusting frequency components of a first analysis windowed frame of input time samples in response to an adjustment frequency spectrum, to produce an output frame of output time samples; and b) synthesis windowing said output frame to produce a synthesis windowed frame of output time samples representing a time varying output signal having reduced perceptibility of said component.

78. The method claimed in claim 77 wherein synthesis windowing comprises synthesis windowing with overlapping synthesis windows having a zero tending taper at boundaries thereof.

79. The method claimed in claim 77 wherein analysis windowing comprises analysis windowing with overlapping analysis windows and wherein analysis windowing and synthesis windowing are performed with overlapping analysis and synthesis windows such that the analysis and synthesis windows are multiplied and summed across overlapping frames to produce a result equal to unity.

80. The method claimed in claim 77 further comprising producing a perceptual component estimate frequency spectrum for use as said adjustment frequency spectrum.

81. The method claimed in claim 80 wherein producing a perceptual component estimate frequency spectrum comprises applying a perceptual model to a reference spectrum and a second windowed spectrum derived from a second analysis windowed frame of input time samples to produce said perceptual component estimate frequency spectrum.

82. The method claimed in claim 81 wherein producing further comprises producing said second analysis windowed frame of input time samples.

83. The method claimed in claim 82 wherein producing further comprises performing a time-to-frequency domain transform on said second analysis windowed frame of in put time samples to produce said second windowed spectrum and applying said second windowed spectrum to said perceptual model.

84. The method claimed in claim 81 wherein producing further comprises producing said reference spectrum.

85. The method claimed in claim 84 wherein producing said reference spectrum comprises retrieving at least one stored reference spectrum.

86. The method claimed in claim 84 wherein producing said reference spectrum further comprises acquiring said reference spectrum from a reference signal.

87. The method claimed in claim 86 wherein acquiring comprises acquiring said reference frequency spectra from said reference signal.

88. The method claimed in claim 84 further comprising producing a time sample frame of said reference signal.

89. The method claimed in claim 88 wherein producing a time sample frame includes retrieving a pre-stored sample frame.

90. The method claimed in claim 88 wherein producing a time sample frame comprises time sampling a portion of said input signal.

91. The method claimed in claim 88 wherein producing further comprises dividing said time sample frame in to sub-frames and producing a corresponding reference frequency spectrum for each sub frame.

92. The method claimed in claim 91 wherein dividing includes dividing said time sample frame in to a plurality of sub-frames of different numbers of samples.

93. The method claimed in claim 91 further comprising producing a Time varying adjustment frequency spectrum by successively selecting said corresponding reference frequency spectra at respective times.

94. The method claimed in claim 93 wherein adjusting comprises synchronizing selection of at least one reference frequency spectrum to a time component of said input signal.

95. The method claimed in claim 94 wherein synchronizing comprises detecting a periodic signal component in said input signal.

96. The method claimed in claim 95 wherein detecting comprises approximating the second time derivative of said in put signal.

97. The method claimed in claim 77 wherein adjusting comprises reducing or increasing at least some frequency components of said input spectrum in response to said adjustment frequency spectrum.

98. The method claimed in claim 93 further comprising performing a time to frequency domain conversion on said first analysis windowed frame to produce an input spectrum and dividing said in put spectrum into input sub-spectra having frequency components within respective frequency bands.

99. The method claimed in claim 98, wherein adjusting comprises adjusting frequency components of said in put sub-spectra in response to respective time varying adjustment frequency spectra to produce respective sub-output spectra having respective sub-output frequency spectra including respective adjusted frequency components of respective input sub-spectra.

100. A computer readable medium for providing computer readable codes for directing a processor circuit to:
   a) adjust frequency components of a first analysis windowed frame of input time samples in response to an adjustment frequency spectrum, to produce an output frame of output time samples; and
   b) synthesis window said output frame to produce a synthesis windowed frame of output time samples representing a time varying output signal having reduced perceptibility of said component.

101. A signal embodied in a carrier wave, said signal having segments for providing computer readable codes for directing a processor circuit to: change the perceptibility of a component of an input signal by;
   a) adjusting frequency components of a first analysis windowed frame of input time samples in response to an adjustment frequency spectrum, to produce an output frame of output time samples; and
   b) synthesis windowing said output frame to produce a synthesis windowed frame of output time samples representing a time varying output signal having reduced perceptibility of said component.

102. An apparatus for changing perceptibility of a component of a signal, the apparatus comprising:
   a) means for adjusting frequency components of a first analysis windowed frame of input time samples in response to an adjustment frequency spectrum, to produce an output frame of output time samples; and
   b) means for synthesis windowing said output frame to produce a synthesis windowed frame of output time samples representing a time varying output signal having reduced perceptibility of said component.

103. An apparatus for changing perceptibility of an undesired component of an in put signal, the apparatus comprising:
   a) an adjustment processor for adjusting frequency components of a first analysis windowed frame of input time samples in response to an adjustment frequency spectrum, to produce an output frame of output time samples; and
   b) a synthesis window for synthesis windowing said output frame to produce a synthesis windowed frame of output time samples representing a time varying output signal having reduced perceptibility of said component.

104. The apparatus claimed in claim 103 wherein said synthesis window has boundaries and a zero-tending taper at said boundaries.

105. The apparatus claimed in claim 103 further comprising an analysis window for windowing said frame of input time samples, wherein the result of multiplying the analysis and synthesis windows and summing across overlapping frames equals unity.

106. The apparatus claimed in claim 103 comprising an adjustment frequency spectrum generator.

107. The apparatus claimed in claim 106 wherein said generator comprises a processor programmed to implement a perceptual model operable to receive a reference spectrum and an input signal spectrum.

108. The apparatus claimed in claim 107 further comprising a second analysis window for producing a second analysis windowed frame of input time samples.

109. The apparatus claimed in claim 108 further comprising a time-to-frequency conversion unit for performing a time-to-frequency conversion on said second analysis windowed frame of input time samples to produce a second windowed spectrum for use as said input spectrum.

110. The apparatus claimed in claim 107 further comprising a processor programmed to produce said reference spectrum.

111. The apparatus claimed in claim 110 wherein said processor is programmed to retrieve at least one stored reference spectrum.

112. The apparatus claimed in claim 110 wherein said processor is programmed to acquire said reference spectrum from a reference signal.

113. The apparatus claimed in claim 110 wherein said processor is programmed to acquire said reference spectrum from said in put signal.

114. The apparatus claimed in claim 110 further comprising a sampler for producing a time sample frame of a reference signal.

115. The apparatus claimed in claim 110 wherein said processor is programmed to retrieve a pre-stored sample frame.

116. The apparatus claimed in claim 113 further comprising a sampler for time sampling a portion of said input signal.

117. The apparatus claimed in claim 114 wherein said processor is programmed to divide said time sample frame into sub-frames and to produce a corresponding reference frequency spectrum for each sub frame.

118. The apparatus claimed in claim 117 wherein said processor is programmed to divide said time sample frame into a plurality of sub-frames of different numbers of samples.

119. The apparatus claimed in claim 117 wherein said processor is programmed to produce a time varying reference frequency spectrum by successively selecting said corresponding reference frequency spectra at respective times, for use in adjusting said frequency components.

120. The apparatus claimed in claim 119 further comprising a synchronizer for synchronizing the selection of at least one reference frequency spectrum to a time component of said input signal.

121. The apparatus claimed in claim 120 further comprising a detector for detecting a periodic signal component in said in put signal.

122. The apparatus claimed in claim 121 further including an approximator for approximating the second time derivative of said input signal.

123. The apparatus claimed in claim 119 wherein said adjustment processor is programmed to divide said input spectrum into input sub-spectra having frequency components within respective frequency bands.

124. The apparatus claimed in claim 123 wherein said adjustment processor is programmed to adjust frequency components of said input sub-spectra in response to respective time varying adjustment frequency spectra to produce respective sub-output spectra including respective adjusted frequency components of a respective input sub-spectra.

125. The apparatus claimed in claim 103 wherein said processor is programmed to reduce or increase at least some frequency components of said input spectrum in response to said adjustment frequency spectrum.

* * * * *